June 12, 1928.

M. F. DEMING

LIGHTING DEVICE

Original Filed July 21, 1922   2 Sheets-Sheet 1

1,673,318

Witnesses:
L. C. Badeau
H. T. Williams

Inventor:
Macey F. Deming
By his Att'y
Chas. S. Williams

June 12, 1928.  1,673,318

M. F. DEMING

LIGHTING DEVICE

Original Filed July 21, 1922   2 Sheets-Sheet 2

Witnesses:
H. C. Badeau
A. J. Williams

Inventor:
Macey F. Deming
By his Att'y,
Chas. S. Williams

Patented June 12, 1928.

1,673,318

UNITED STATES PATENT OFFICE.

MACEY F. DEMING, OF TAPPAN, NEW YORK.

LIGHTING DEVICE.

Application filed July 21, 1922, Serial No. 576,545. Renewed November 15, 1927.

The present invention relates to lighting or illuminating devices, and more particularly to lamps, and especially to lamps for road lighting or vehicle lamps.

In the problem of providing a means or device for lighting, or lamp, of the character mentioned, the sense of sight assumes an important part, and for a good understanding of the present invention the process of sight and the properties of light should first be taken into consideration.

The process of sight is as follows: Light falls upon an object and is then reflected to the eye. It is this reflected light which enables the object to be seen.

The eye is a flexible organ which adjusts itself to lights of different strengths or intensities. When a strong light strikes the eye the pupil of the eye contracts and shuts out an excess of light, as too much strong light prevents the eye from seeing. In a weak light the pupil of the eye dilates to admit a larger quantity of weak light, for there is also no sight if too small a quantity of weak light strikes the eyes. Within a certain range it is immaterial whether a small quantity of strong light or a large quantity of weak light is admitted to the eye, as there is no difficulty in seeing an object in either such case. But if there is a sudden change in the intensity of the light, there is no sight during the period in which the eye is adjusting itself to the change in the strength of the light. This is illustrated by going from a poorly lighted room into one brilliantly illuminated, or by doing the reverse of this.

Thus in the present practice of vehicle road lighting, when two vehicles meet it does not help matters if the lights on the vehicles are suddenly dimmed, for the eyes of each driver must adapt themselves to a new light condition, and during the period of adaptation they are to all purposes sightless.

The eye always adapts itself to the strongest light reaching it and in adapting itself to the strongest light contracts its aperture to reduce the amount of light admitted. As a dilated pupil is needed to produce sight with a weak light, a strong light striking the eyes at the same time will render invisible an object that had been easily seen in a weak light from another source, by contracting the pupils of the eyes and shutting out the large quantity of weak light needed to produce sight.

The light reflected to the eye from any object is always much weaker than the light which falls upon the object. Thus in the case of road vehicle lighting a person may see objects ahead and the road by an automobile headlight; but if another automobile approaches with lights of the same, or even less strength than the first headlight, the person is blinded because the light from the lamps of the approaching car to his eyes is much stronger than the light reflected from the road or from other objects; and by causing the apertures of the eyes to contract shuts out the weaker reflected light.

It is evident that the difficulty, so far, is connected with the physiology of the eye, and is the result of trying to see in the presence of lights of different intensities.

The solution of the problem depends upon devising a means or device whereby any light much stronger than that reflected from the road and from objects near, or on the road, is prevented from reaching the eye, and whereby to provide for eyes affected by two different lighting conditions—the eyes of the person behind or in the rear of the device or lamp, and the eyes of the person meeting or facing the device or lamp, and this I accomplish by the novel and peculiar means, device or lamp hereinafter described.

The object of the invention is to provide an illuminating device by which the difference between the intensity of the light reflected from objects desired to be seen, and illuminated by the device, and the intensity of light from the primary source of the light normally reaching eyes facing the primary source of light, may be reduced without the use of lenses or other means for refracting light.

Another object is to provide an illuminating device without the use of lenses or other means for refracting light, by which substantially no light from the device of greater intensity than that reflected from objects desired to be seen by the light from the primary source of the light reaches eyes facing the primary source of the light.

Another object is to provide an illuminating device without the use of lenses or other means for refracting light, by which substantially no light except that reflected from objects desired to be seen reaches eyes facing the primary source of the light.

Another object is to provide an illuminating device by which the different types of rays of light that can be thrown off by a reflecting means in the device, may be controlled and utilized for specific and different purposes, without the use of lenses or other means for refracting light.

Another object is to provide an illuminating device by which illumination may be made to extend only to one or more predetermined distances in front of the primary source of light without the use of lenses or other means for refracting light.

Another object is to provide an illuminating device by which without the use of lenses or other means for refracting light, or the use of screens, certain predetermined sectors of an arc in front of the primary source of the light may be illuminated and other sectors not illuminated.

Another object is to provide an illuminating device by which sectors of an arc in front of the primary source of light may be illuminated or not at will, and the distance in front of the device to which illumination is to extend may be varied at will.

Another object is to provide an illuminating device by which the light projected from the primary source of light may be moved within certain fixed and predetermined arcs only.

Another object is to provide an illuminating device by which the light projected from the primary source of light may be moved by successive fixed steps through a certain fixed arc.

Another object is to provide an illuminating device by which the fixed distances the projected light is to be moved may be varied.

Another object is to provide an illuminating device by which the various types of light rays projected from the primary source of light may be moved by fixed steps by an operator distant from the primary source of the light.

Another object is to provide an illuminating device by which the various types of light rays projected from the primary source may be controlled by an operator distant from the primary source of light.

Another object is to provide an illuminating device by which light projected from the primary source of light may be divided and controlled without the use of lenses or other means for refracting light.

To the accomplishment of the recited objects and others of a like or kindred nature, and although the invention is susceptible of embodiment in various other forms, I have selected one embodiment in the form of a lamp for the purpose of illustration; but it should be distinctly understood that such embodiment of the invention is for the purpose of illustration only, and is not designed as a definition of the invention, reference being had to the appended claims for this purpose.

Referring to the accompanying drawings which form part of this specification and illustrate said one embodiment, Figure 1 is a perspective view of the lamp with the covering portions thereof removed for exposing the interior.

Figure 1:
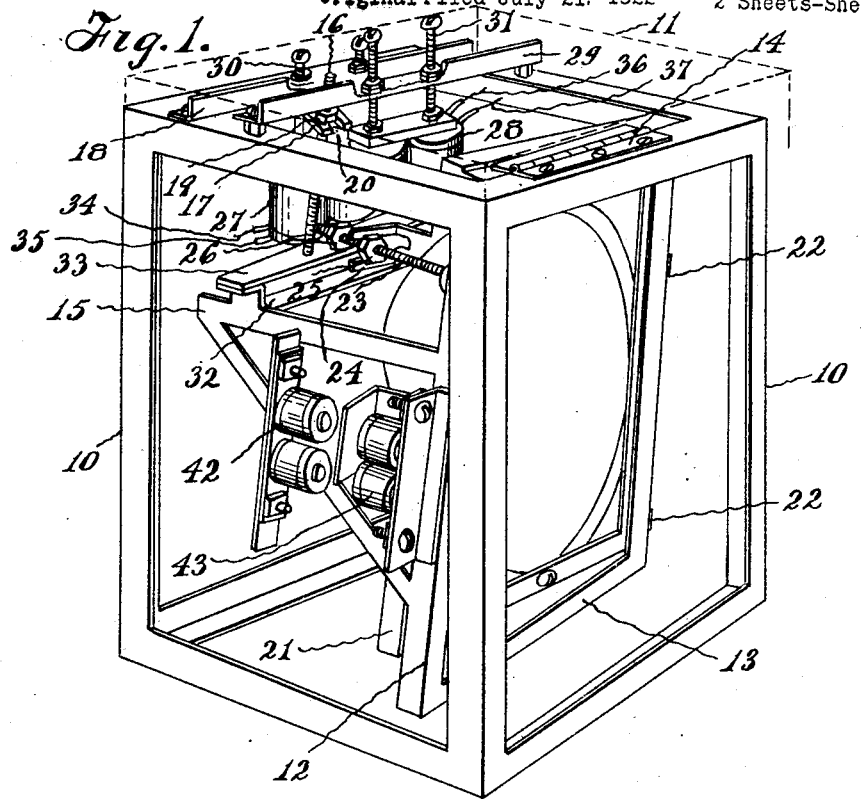

The invention, as shown, comprises the outer or primary frame 10, of cubical or box shape. The frame 10 serves as a primary supporting means for the mechanism of the lamp, and also as a support for a suitable protective cover or dust cover indicated by the broken lines 11, the covering portions being removed in the drawings for convenience in showing the parts of the lamp, these covering portions being of suitable material relative to their position and function in the lamp.

The frame 10 is of any light but strong and rigid metal, preferably of angle form, that is, having flanges at right angles to each other providing means for readily securing parts of the lamp thereto.

The secondary supporting frame 12 is also of light but rigid and strong metal, preferably of angle form, and comprises the rectangular front or face portion 13, arranged to fit, or be conformably received within, the confines of the front or face of the primary frame 10, the front or face portion 13 being attached for pivotal movement at its top, as by the hinge 14, to the top of the front or face of the primary frame 10, the secondary frame 12 being permitted to move or swing in a substantially vertical arc, or upwardly from a normal vertical position.

The secondary supporting frame 12 is provided with a frame bracket 15, of triangular or prism shape, when viewed from the side, the base of the frame bracket 15 being rigidly secured to the uprights of the secondary frame 12. the hypothenuse of the frame bracket facing downwardly and rearwardly.

It will be noted that if means for lifting be applied to the upwardly facing side of the frame bracket 15, the secondary supporting frame 12 will be caused to move or swing on its pivotal point or line, as at 14, through the before mentioned arc, and upon release of the lifting means will be returned to its first or normal position by gravity.

Figure 2:
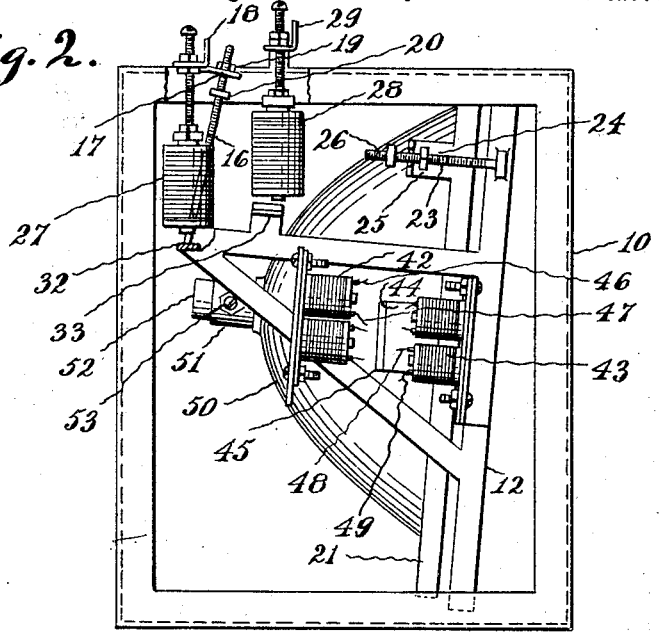
Figure 2, is a side elevation of the lamp.

For maintaining the secondary supporting frame 12 in position for arcual movement and for determining or regulating the extent of this movement means is provided comprising the threaded rod 16, Figures 1 and 2, secured at its lower end to the rearward portion or free end of the frame bracket 15, the upper end of this rod being received in a guide bracket 17 secured to a side cross piece 18 of the primary supporting frame 10 at the top and rear of said frame, the rod 16 being movable longitudinally in the guide bracket 17. For limiting the movement of the rod 16 adjustable nuts 19 and 20 are provided, the nut 19 engaging the rod 16 on the upper side of the guide bracket 17, the underside of this nut bearing upon the upper surface of the guide bracket, while the nut 20 engages the rod 16, below the guide bracket 17, the nuts 19 and 20 being spaceable apart on the rod 16, and the nut 20 being engageable with the under side of the guide bracket by upward or longitudinal movement of the rod 16, the extent of the arcual movement of the secondary supporting frame 12 being determined by the adjustment or spacing apart of nuts 19 and 20 on the rod 16.

The reflector frame 21, is of light but strong and rigid metal, preferably of angle form, and is arranged to fit in or be received conformably within the confines of the front or face portion 13 of the secondary frame 12.

Figure 3:
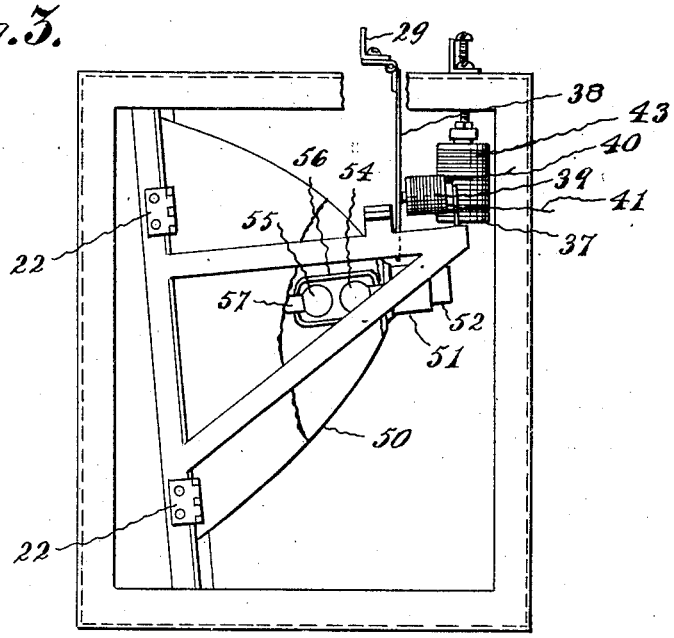
Figure 3, is a side elevation of the lamp viewed from the side of the lamp opposite to the first mentioned side.

The reflector frame 21 is attached for pivotal movement, as by the hinges 22, Figures 1 and 3, to the sides of the uprights of the secondary supporting frame 12, the reflector frame being permitted to move or swing upon its said pivotal line or point in a substantially horizontal arc, or laterally, from a normal horizontal position.

It will be noted that if means appurtenant or secured to the frame bracket 15 be provided for pulling or drawing the reflector frame 21 rearwardly, that is towards the rear of the lamp, and if a pulling force is exerted upon the reflector frame, as at a point on the adjacent upright thereof, this frame will be moved or swung rearwardly upon its said pivotal line or point in a substantially horizontal arc. And if means appurtenant to or secured to the secondary supporting frame and exertible on the reflector frame, as at said point on the adjacent upright thereof, be provided for drawing this frame forwardly, upon release of said means for drawing or pulling the reflector frame rearwardly and operation of said means for drawing or pulling the reflector frame forwardly, the reflector frame will be returned to its first or normal position.

It will be noted that the reflector frame in addition to being movable in a horizontal arc, or laterally, may be moved in a vertical arc when the secondary supporting frame is so moved, due to the connection of the reflector frame to the secondary supporting frame.

For determining or regulating the extent of the arcual movement of the reflector frame 21 means is provided comprising the threaded rod 23, Figures 1 and 2, which is secured at its forward or outer end to the secondary supporting frame 12 near the top thereof. The rod 23 is received and is movable longitudinally in the guide bracket 24 secured to the side of the reflector frame 21 near the top thereof. For limiting movement of the rod 23 adjustable nuts 25 and 26 are provided, the nut 25 engaging the rod 23 forwardly of the guide bracket 24 and being engageable with the forward side of said bracket; and the nut 26 engaging the rod 23 rearwardly of the guide bracket and being engageable with the rear side thereof, the nuts 25 and 26 being spaceable apart on the rod 23, and the extent of the arcual movement of the reflector frame 21 being determined or regulated by the adjustment or spacing apart of the nuts 25 and 26 on the rod 23.

As means for arcual movement of the secondary supporting frame successively operative electro-magnets are employed, the electro-magnets being appurtenant to the primary supporting frame and acting on the secondary supporting frame, as shown acting on the frame bracket thereof. The secondary supporting frame is moved by magnetic attraction of a first magnet through a portion of its arc of movement into the zone or sphere of magnetic attraction of an adjacent or successive magnet until by successive movements the full or desired arcual movement of the secondary frame is attained, it being possible to maintain the secondary supporting frame stationary in its arc of movement at the point determined by any of said successive movements by operation of the proper one of the electro-magnets to the exclusion of operation of the others. Upon release of influence of the magnets upon the secondary frame, the frame will return by gravity to its normal vertical position, but may be held stationary as desired during said return movement by operation of the proper one of the electro-magnets to the exclusion of the operation of the others.

The electro-magnets 27 and 28 are supported by the cross-pieces 18 and 29 secured to the sides of the top of the primary supporting frame 10, the respective stems 30 and 31 of the magnets passing loosely through the cross-pieces and the magnets being adjustable for raising or lowering, or for rigid or loose mounting, by suitable nuts or burrs.

The electro-magnets 27 and 28 are respectively contactible with the cross pieces 32 and 33 secured to the frame bracket 15 on the upper side thereof, the cross-piece 33 being off-set from or arranged in a higher plane relative to the top of the frame bracket than the cross-piece 32 for the purpose later stated.

The electro-magnet 28 is loose hanging, and capable of being lifted in its mounting in the cross-piece 29, and the cross-piece 33 is normally within the zone of attraction of the electro-magnet 28.

The electro-magnet 27 is adjusted to depend rigidly and the cross-piece 32 is normally outside of or beyond the zone of attraction of the magnet 27, the arrangement being such that the cross-piece 32 may be brought within the zone of attraction of the electromagnet 27 by movement of the frame bracket 15 upwardly through the action of the electro-magnet 28 upon the cross-piece 33. As the cross piece 32 is drawn up to the plane of the face of the electromagnet 27, the electro-magnet 28, due to its loose mounting, and the cross piece 33 in contact with the magnet 28, move upwardly, the frame bracket 15 and the reflector frame 21 thus being moved upwardly or through a vertical arc by successive movements.

By this, what I term, stepped arrangement of cross-pieces and loosely and rigidly mounted electro-magnets any desired number of sucessively operative magnets, limited of course by the size and requirements of the lamp, may be employed for moving the frame-bracket, and the secondary supporting frame and reflector frame, through a vertical arc by successive short movements.

In practice the supporting frame 10 may be provided with a suitable enclosing top or cover indicated by the broken lines in Figure 1, affording sufficient clearance for the upper ends of the magnets and the cross-pieces which support them, which top or cover may constitute the top or cover of the lamp.

For energization the electro-magnets 27 and 28 are connected to a source of electricity—not shown—such as the battery of a motor vehicle, by suitable wires such as 34 and 35 and 36 and 37, energization or non-energization being controlled by suitable means or switches, also not shown, co-operating with the wires.

For preventing jarring movement of the secondary supporting frame 12, as when due to movement of the vehicle to which the device or lamp is attached and when the device is not in use for illumination, I provide the dependent plate or strip 38, Figure 3, of magnetic metal, the upper end of which is secured to the cross-piece 29 and the lower end of which is free, this plate or strip extending downwardly within the zone of attraction of the electro-magnet 39 supported on the rear cross-piece of the frame-bracket 15 and connected to the supply of electricity, not shown, by suitable wires such as 40 and 41, energization or non-energization being controlled by suitable means or switches, also not shown, co-operating with these wires. Thus by energization of the electro-magnet 39 the plate or strip 38 will be drawn into contact with the electro-magnet, and the frame-bracket 15 and secondary supporting frame 12 will be held in rigid connection with the primary supporting frame 10, the plate or strip 38 and magnet 39 providing a lock for the frame-bracket and secondary supporting frame.

As means for moving the reflector frame laterally or through a horizontal arc, alternately operative electro-magnets are employed, these electromagnets being appurtenant to the secondary supporting frame in opposed relation to each other, means appurtenant to the reflector frame being interposed between the active ends of the magnets for alternate action of the magnets thereon for moving the reflector frame. The electromagnet 42, as shown, is secured exteriorly thereof, to the side of the frame-bracket 15 opposite to the hinged side of the reflector frame 21. The bracket-plate 44, having the rectangular portion or offset 45 made of magnetic metal, is secured at its end opposite to the offset 45, to the adjacent side upright of the reflector frame 21. The electro-magnet 43 is secured to the adjacent side upright of the secondary supporting frame 12, the offset 45 being located between the electro-magnets 42 and 43 and within the zone of attraction of each of these magnets.

Thus it will be seen that by operation of the electro-magnet 42, the electro-magnet 43 not being operated, the bracket plate 44, and with it the reflector frame 21, will be drawn laterally, or sidewise, or through a horizontal arc; and by operation of the electro-magnet 43, the electro-magnet 42 not being operated the bracket-plate 44, and with it the reflector frame 21 will be drawn reversely to its first direction of movement, or to its first or normal position, and may then be held locked in this position against jarring movement. For energization the electro-magnets 42 and 43 are connected to a source of supply of electricity, not shown, by suitable wires, such as 46 and 47 and 48 and 49, energization or non-energization being controlled by suitable means, also not shown, co-operating with the wires.

While the members or parts of the device or lamp which are susceptible to attraction of the various electro-magnets are described as being of magnetic metal, it is within the purview of the invention that these members or parts may be of any suitable material not susceptible to such attraction operatively arranged and connected to suitable means which is susceptible to the attraction of the respective magnets, arranged for co-operating between such members or parts and the electro-magnets for providing the described movements or functions of the members or parts.

The reflector 50, which preferably is a parabolic reflector, is secured at its periphery to the inner side of the front of the reflector frame 21, the reflector being supported at its front by the reflector frame and extending rearwardly in the device or lamp.

The reflector 50 is provided at its rear, in its axial line, with a cylindrical member or neck 51, having an inner sleeve 52 slidably movable therein, the sleeve 52 being adjusted in the neck 51 by suitable means, such as the set screw 53.

When a light is placed in a parabolic reflector the kind of rays thrown off by the reflector will depend upon the shape or form of the light and its position relative to the focus of the reflector. This focus is a mathematical point, so the smaller the light and the more compact it is, the more exactly it can be located in the theoretical focus of the reflector or at any desired distance from it.

In the present invention the light is so arranged as to divide it in such manner that more than one type of projected light is under control, as shown in Figure 12. The tilting central pencil $x$, does not throw the side light or pencil into the eyes of a person facing the reflector, or device or lamp comprising the reflector. Such a device or lamp is practically non-visible to such person, but projects a prodigious amount of light for illuminating objects which are visible to such person without glaring effect of the light upon the eyes of such person.

It will be noted that there are two lights shown in Figure 12. One, such as $f$, throws or projects a forward distance pencil, and the other such as $g$, throws a forward and sidewise pencil. By use of suitable means either pencil can be extinguished at will, thereby completely changing the type of the device or lamp. The distance on the axial line of the reflector between the lights determines the width of the non-illuminated section $y$, and the distance ahead of the reflector at which it will be found. This non-illuminated area may be made to equal the width of a road. When this is done a person coming towards the lamp or device will see no lamp, except faintly, until well inside of the non-illuminated area, or where the light that forms the boundaries of the dark or non-illuminated area is encountered. A road thus may be lighted on both sides for any desired distance ahead of the lamp or device, but not in the center. And it is possible to have an automobile equipped with head-lights which will brilliantly illuminate the road for example, one hundred feet ahead and no farther, all the light leaving the road on the sides at this distance. Just how far apart the lights should be must be determined according to the lighting problem; but this is a detail and not an essential.

Figure 4:
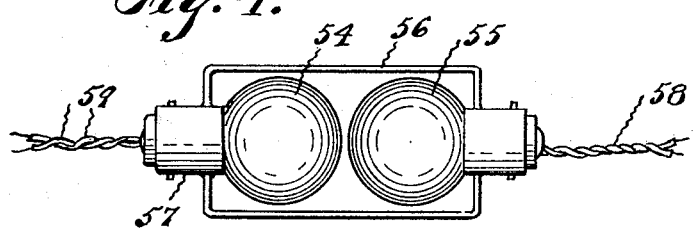
Figure 4, is a detail view on an enlarged scale of electric lamp bulbs or filaments comprised in the lamp.
Figure 5:
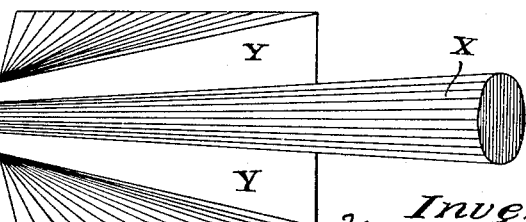
Figure 5 is a diagrammatic view for illustrating the action of light resulting from the co-operation of means for reflecting or projecting light and means constituting a source or sources of illumination. Similar reference characters denote similar parts throughout the several views.

As means for bring about the action of light substantially as illustrated by Figure 5, the present embodiment of the invention is provided with two electric light bulbs, 54 and 55, Figures 3 and 4, which may be, but not necessarily are, of substantially the same candle power, these bulbs being arranged in alined opposed relation in the same plane, bulb to bulb, in a cage 56, the insertible or socket end 57 of the bulb 54 being receivable in the slidable member or sleeve 52 in the neck 51 of the reflector, the cage 56, and with it the electric bulbs 54 and 55, being movable in the cylindrical neck member 51 and being adjustable along the axis of the reflector by means of the set-screw 53, the bulbs 54 and 55 thereby being positionable in the axial line of the reflector in respective desired relation to the focus of the reflector; that is, the light, lighting filament or source of illumination of the bulb 54 may be located in the focus of the reflector, and the light, lighting filament or source of illumination of the bulb 55 may be located forwardly of said focus; or the light, lighting filament or source of illumination of the bulb 55 may be located in the said focus and the light, lighting filament or source of illumination of the bulb 54 may be located rearwardly of said focus.

For illuminating the bulbs suitable wires 58 and 59 are provided for connecting the bulbs with a suitable supply of electricity, not shown, and suitable means or switches for co-operating with the wires, also not shown, may be provided for controlling the lighting or illumination of the bulbs, whereby the same may be concurrently lighted or illuminated, or one bulb may be lighted or illuminated to the exclusion of the other, said means being located in any suitable position for readily controlling such illumination or non-illumination. In the case of an automobile, or motor vehicle this means may be located on the dash, cowl, or steering wheel or in any position convenient to the driver, the device or lamp itself in the case of a motor vehicle being attached by any suitable means in a suitable position at the front of the vehicle.

In operation: An electric light or electric lamp 54 is placed in and slightly behind the focus of the reflector, being moved along the axis of the reflector by means of the sliding sleeve, until any desired area is illuminated at any desired distance ahead. This light is now extinguished. A second electric light or lamp 55 is placed on the axis ahead of the focus at the position needed to make the light projected by the reflector leave the road at the sides at any desired distance ahead of the lamp. The longer the electric light or lighted filament is along the axis of the reflector the more light will be thrown off sidewise near the lamp.

When the forward light 55, is turned on, the sides of the road will be illuminated and the center of the road not illuminated. When the rear light 54, is turned on the center of the road will be illuminated but not the sides. When lights 54 and 55 are both turned on the center of the road and both sides will be illuminated.

When the device or lamp is in place on the vehicle the adjusting nuts 19 and 20, Figure 2, are moved so that the light or pencil illuminating the center of the road, or straight ahead, is brought up or down to a predetermined level for road lighting purposes. The nuts are now fastened and the light or pencil will be projected forwardly at this predetermined level, provided the lamp remains in a stationary position. If it is desired to move the pencil or light below the predetermined level fixed by the adjusting nuts, lifting the frame 12 by hand or preferably by means of the magnets 27 and 28 will depress the pencil or light any desired amount. If it is desired to move the pencil or light horizontally the nuts 25 and 26, Figure 2, are spaced for the normally required arc, when the reflector frame may be moved by hand to obtain the desired result, or preferably by the magnets 42 and 43.

To prevent vibration of the movable frames of the lamp when the lamp is normally inoperative and subject to jarring movement, these frames may be held in both vertical and horizontal positions by actuating the magnetic locks, plate 38 and magnet 37, magnet 43 co-operating with the plate 44.

When meeting another car, or a pedestrian, the difference of intensity between the light from the lamp and the light reflected from objects in the road or at the sides of the road is done away with by causing the light projected from the lamp to make an angle with eyes facing the lamp, the light itself viewed at an angle being invisible to eyes facing the lamp. This is done by depressing the center pencil, or swinging it horizontally; or by extinguishing it and using the sidewise pencil; or by extinguishing the sidewise pencil and using the center pencil, as will fit the conditions. Under all conditions the driver of the vehicle can have full illumination without throwing into eyes facing him light stronger than that reflected from objects illuminated by the lamp.

When it is stated that the light, light providing means, or filament is placed in and slightly behind the focus of the reflector it is meant that the forward tip of the light is in the focus, or the smallest possible distance behind it. As the focus is a mathematical point one one-thousandth of an inch forwardly or rearwardly thereof will cause the projected rays to diverge from the theoretically parallel rays that would be projected if the light, light providing means or filament was exactly the size of the mathematical focal point.

It is within the purview of the invention to use more than two lights, light providing means or filaments arranged relative to the axial line and focal point of the reflector, one such to furnish a central forward pencil, a second pencil to light the road a certain distance ahead at the sides, and a third pencil to light only a short distance ahead at the sides; extinguishing the central forward pencil leaves the sides of the road lighted well ahead; extinguishing the second pencil leaves the sides of the road well lighted a shorter distance ahead by the third pencil.

Having thus described my invention, it should be understood that there may be modifications thereof and variations therein without departing from the spirit of the invention, or exceeding the scope of the appended claims.

What I claim and desire to protect by Letters Patent is:—

1. In an illuminating device, in combination, a reflector movable through a vertical arcuate path and movable through a horizontal arcuate path, a light source cooperating with the reflector for projecting from the device a sidewise and forward luminous pencil, a second light source cooperating with the reflector for projecting from the device a forward distant luminous pencil, means for moving the reflector step by step through each of its arcuate paths, and means for positively limiting the movement of the reflector to a predetermined portion of each of its arcuate paths.

2. In an illuminating device, in combination, a reflector movable through a vertical arcuate path and movable through a horizontal arcuate path, a light source cooperating with the reflector for projecting from the device a sidewise and forward luminous pencil, a second light source cooperating with the reflector for projecting from the device a forward distant luminous pencil, means for moving the reflector step by step through each of its arcuate paths, and settable means for limiting the movement of the reflector to a predetermined portion of each of its arcuate paths.

3. In an illuminating device, the combination with a reflector supported for movement through a vertical path and for movement through a horizontal path, of means comprising stepped magnets for moving the reflector through said vertical path; and means comprising opposed magnets for moving the reflector through said horizontal path.

4. In an illuminating device, the combination of, a frame movable through a vertical path and through a horizontal path; a reflector movable with the frame; means for moving the frame through each of its paths; and means for setting the frame for limitation of the movement thereof in each of its paths.

5. An illuminating device, comprising, a frame movable through a vertical path and through a horizontal path; a reflector movable with the frame; magnets for moving the frame through its vertical path; magnets for moving the frame through its horizontal path; means for setting the frame for limitation of the movement thereof in each of its paths; and means for independently operating the magnets for moving the frame through its vertical path and for independently operating the magnets for moving the frame through its horizontal path.

6. An illuminating device comprising, a frame movable through a vertical path and through a horizontal path; a reflector movable with the frame; stepped magnets for moving the frame through its vertical path; opposed magnets for moving the frame through its horizontal path; means for setting the frame for limitation of the movement thereof in each of its paths; and means for independently operating the stepped magnets and the opposed magnets.

7. An illuminating device comprising, a frame movable through a vertical path and through a horizontal path; a reflector movable with the frame; magnets for moving the frame through its vertical path; magnets for moving the frame through its horizontal path; means for setting the frame for limitation of the movement thereof in each of its paths; and means for independently operating the magnets for moving the frame through its vertical path and for independently operating the magnets for moving the frame through its horizontal path.

8. An illuminating device comprising, a primary frame; a secondary frame supported by the primary frame for vertical swinging movement; a reflector frame supported by the secondary frame for horizontal swinging movement; the reflector frame being moved vertically when the secondary frame is moved vertically; a reflector supported by the reflector frame and movable therewith; a plurality of lights arranged on the axial line relative to the focal point of the reflector for cooperating therewith for projecting light from the device; means for moving the secondary frame vertically and thereby moving the reflector frame vertically; and means for moving the reflector frame horizontally.

9. An illuminating device comprising, a primary frame; a secondary frame supported by the primary frame for vertical swinging movement; a reflector frame supported by the secondary frame for horizontal swinging movement; the reflector frame being movable vertically when the secondary frame is moved vertically; a reflector supported by the reflector frame and movable therewith; a plurality of lights arranged on the axial line relative to the focal point of the reflector for cooperating therewith for projecting light from the device; electric means for moving the secondary frame vertically and thereby moving the reflector frame vertically; and electric means for moving the reflector frame horizontally.

10. An illuminating device comprising, a primary frame; a secondary frame supported by the primary frame for vertical swinging movement; means for regulating the length of said vertical swinging movement; a reflector frame supported by the secondary frame for horizontal swinging movement; means for regulating the length of said horizontal swinging movement; the reflector frame being moved vertically when the secondary frame is moved vertically; a reflector supported by the reflector frame and movable therewith; a plurality of lights arranged on the axial line relative to the focal point of the reflector for cooperating therewith for projecting light from the device; means for moving the secondary frame vertically and thereby moving the reflector frame vertically; and means for moving the reflector frame horizontally.

11. An illuminating device comprising, a primary frame; a secondary frame supported by the primary frame for vertical swinging movement; means for regulating the length of said vertical swinging movement; a reflector frame supported by the secondary frame for horizontal swinging movement; means for regulating the length of said horizontal swinging movement; the reflector frame being movable vertically by vertical movement of the secondary frame; a reflector supported by the reflector frame and movable therewith; a plurality of lights arranged on the axial line relative to the focal point of the reflector for cooperating therewith for projecting light from the device; said lights being lightable or extinguishable at will; means for moving the secondary frame vertically and thereby moving the reflector frame vertically; means for moving the reflector frame horizontally; and means for lighting or extinguishing predetermined ones of said lights at will.

12. An illuminating device comprising, a primary frame; a secondary frame supported by the primary frame for vertical swinging movement; means for regulating the length of said vertical swinging movement; a reflector frame supported by the secondary frame for horizontal swinging movement; means for regulating length of said horizontal swinging movement; the reflector frame being moved vertically by vertical movement of the secondary frame; a reflector supported by the reflector frame and movable therewith; a light carrier arranged in the reflector on the axial line thereof having electric lights positionable on the axial line relative to the focal point of the reflector for cooperating therewith for projecting light from the device; means for lighting or extinguishing predetermined one of said lights at will; electromagnets for moving the secondary frame vertically; electro-magnets for moving the reflector frame horizontally; and a protective covering for the device.

13. An illuminating device comprising, a primary frame; a secondary frame supported by the primary frame for vertical swinging movement; means for regulating the length of said vertical swinging movement; means for preventing jarring movement of the secondary frame; a reflector frame supported by the secondary frame for horizontal swinging movement; means for regulating the length of said horizontal swinging movement; the reflector frame being moved vertically when the secondary frame is moved vertically; means for preventing jarring movement of the reflector frame; a reflector supported by the reflector frame and movable therewith a light carrier arranged in the reflector on the axial line thereof having electric lights positionable on the axial line relative to the focal point of the reflector for cooperating therewith for projecting light from the device; said lights being lightable or extinguishable at will; stepped electro-magnets for moving the secondary frame vertically and thereby moving the reflector frame vertically; opposed electro-magnets for moving the reflector frame horizontally; a protective covering for the device; means for mounting the device upon a motor vehicle; means for operation of the said stepped magnets by the driver of said vehicle; means for operation of said opposed magnets by the driver of said vehicle; and means operable by said driver for lighting or extinguishing at will predetermined ones of said lights.

MACEY F. DEMING.